Sheet 1 - 2 Sheets.
R. H. Cole,
Nut Machine,
No. 901. Reissued Feb. 21, 1860.
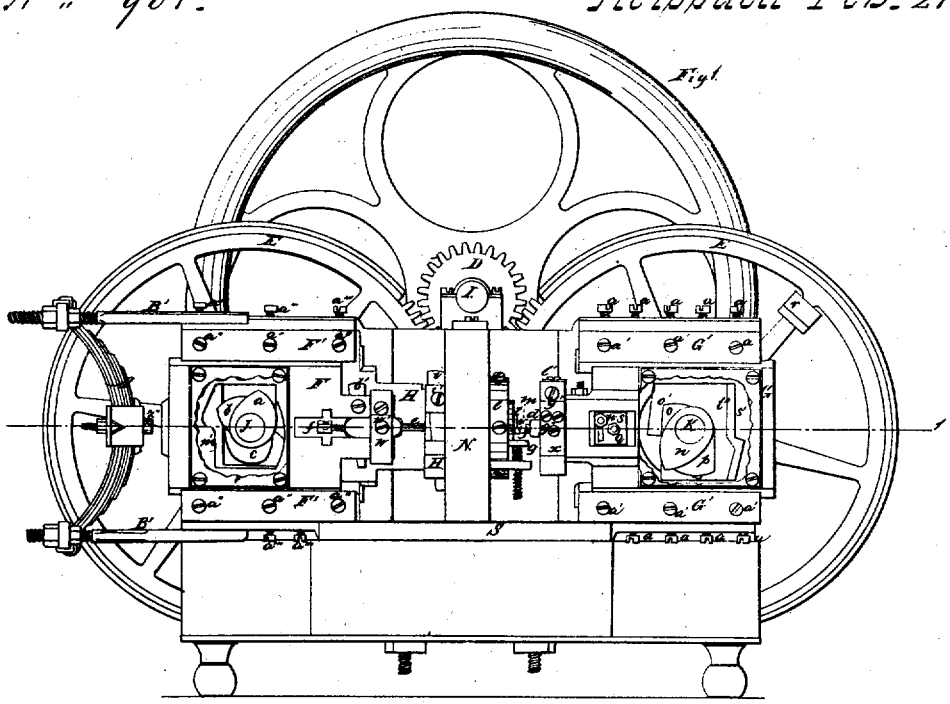
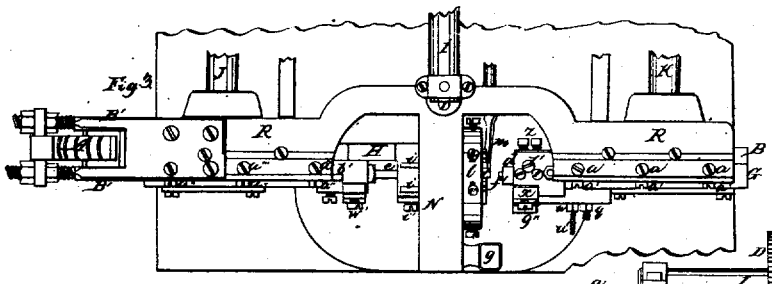
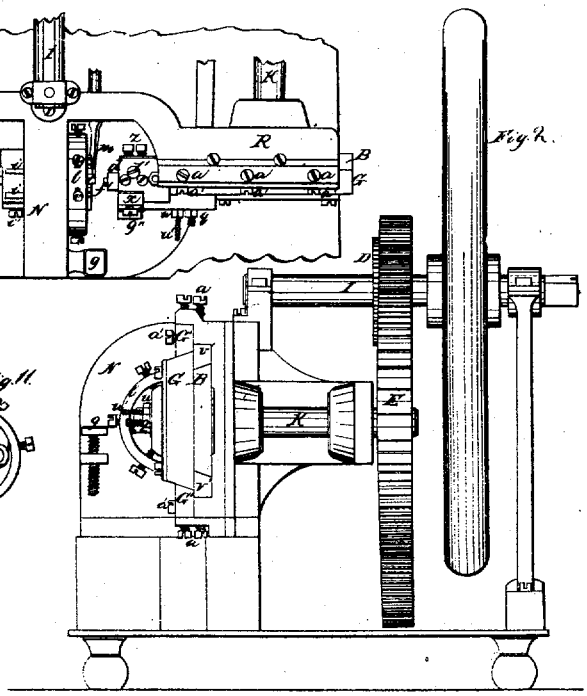
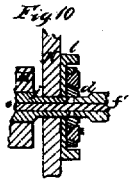
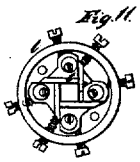

Sheet 2 - 2 Sheets

R. H. Cole,

Nut Machine,

No. 901

Reissued Feb. 21, 1860.

UNITED STATES PATENT OFFICE.

R. H. COLE, OF ST. LOUIS, MISSOURI.

IMPROVEMENT IN MAKING NUTS.

Specification forming part of Letters Patent No. 15,003, dated June 3, 1856; Reissue No. 901, dated February 21, 1860.

*To all whom it may concern:*

Be it known that I, RICHARD H. COLE, of the city and county of St. Louis, and State of Missouri, have invented a new and useful Improvement in Making Metallic Nuts; and I do hereby declare that the following is a full, clear, and exact description thereof, reference being had to the annexed drawings, making part of this specification, in which—

Figure 5:
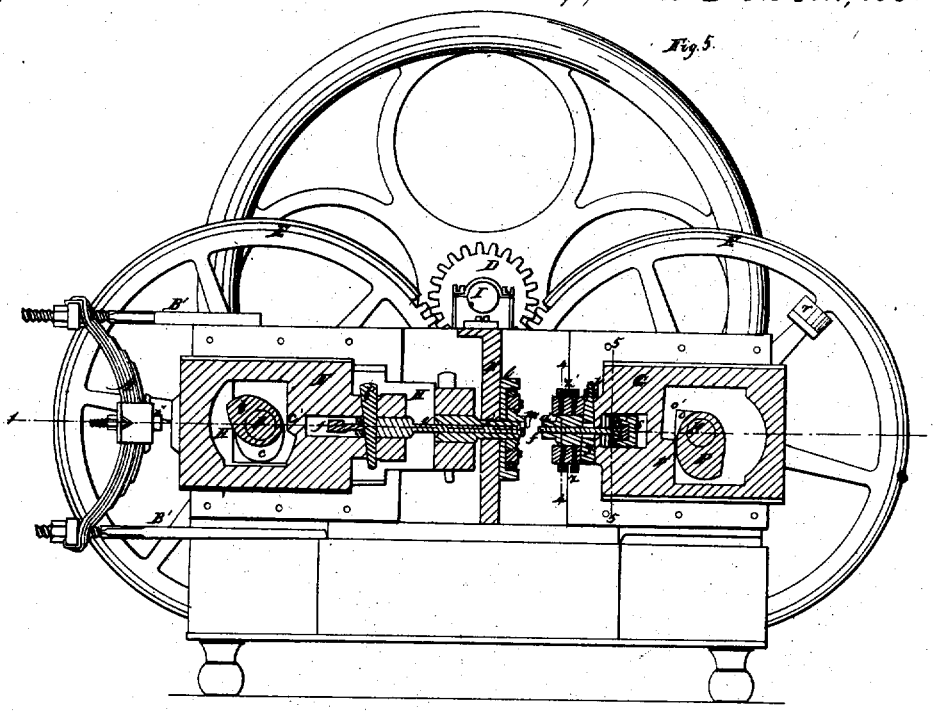
Figure 9:
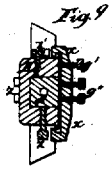
Figure 8:
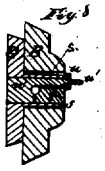
Figure 7:
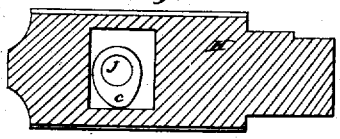
Figure 6:
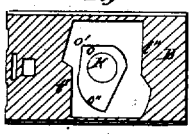
Figure 4:
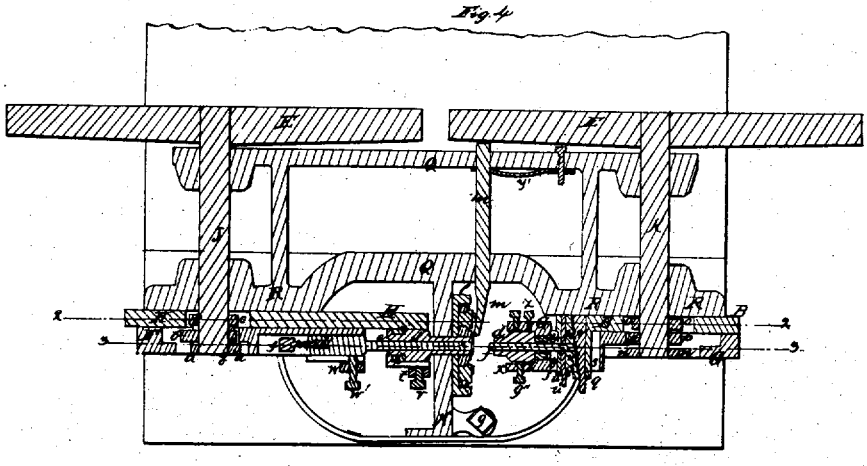

Figure 1 is a side elevation of the aforesaid machine; Fig. 2, an end view of the same; Fig. 3, a top view; Fig. 4, a horizontal section in the line 1 1 of Fig. 1; Fig. 5, a vertical longitudinal section in the line 3 3 of Fig. 4; Figs. 6 and 7, vertical sections of detached portions of the machine in the line 2 2 of Fig. 4; Fig. 8, a transverse section of a detached portion of the machine in the line 5 5 of Fig. 5; Fig. 9, a transverse section of a detached portion of the machine in the line 4 4 of Fig. 5; Fig. 10, a vertical longitudinal section of a portion of the machine in the line 1 1 of Fig. 1, showing the parts represented as having just formed a nut in the nut-box; and Fig 11 is a front view of the nut-box detached from the machine.

The features of novelty in my improved machine for making metallic nuts is the peculiar arrangement and operation of its parts, by which the nuts formed in the said machine are thicker than the bar from which they are cut, this being accomplished by forcing all or nearly all the metal displaced in forming the hole in the nut into the body of said nut. The advantages that follow from this improvement are self-evident.

The nuts made in my machine will be more perfect in form, and the wads which are removed by other machines in forming the holes in the nuts, and which have to be sold at a very low price as scrap-iron, being by my process put in the manufactured article, causes the improved nuts made by my machine to cost considerable less than the less perfect nuts made by any other known machine.

The nut-box in which the nuts are formed in my said machine may be constructed in any manner that may be deemed expedient. It should be so constructed as to have a cutting angle on the front side of its mouth for the purpose of enabling a blank for a nut to be cut from a bar by the joint action of the said cutting angle and the front angle of the angular punch *d* as it is carried forward toward the nut-box and is brought in contact with the bar fed into the machine immediately in front of said box. The projections *t r* from the top and farther side of the mouth of the nut-box, in connection with the adjustable rest *g*, enable the operator to accurately guide the end of the bar to the proper position in front of the nut-box as it is fed into the machine.

The angular punch *d* is received into a mouth in the head of the sliding plate G, where it is held in front by the clamp H and the set-screws *g'' g''*, and at its top, bottom, and rear sides by set-screws which pass through the top, bottom, and rear sides of the said mouth, as shown in Fig. 9. The inner end of the body of the angular punch *d* bears against the wedge *y*, which works in a vertical opening in the head G, and has a screw-shank at its upper extremity on which works the regulating-nut *k*. By means of the lateral and vertical set-screws *z z' g' g''* and the adjustable wedge *y* the angular punch *d* can be moved out and in, and may be adjusted in any desired position. The requisite motions are imparted to the angular punch *d* by means of two differently-shaped cams, *n* and *p*, on the shaft K, which work within a doubly-recessed opening in the plate G, whose working-faces are of such a shape that the former cam serves to move said plate rearward and the latter to move said plate forward, and to retain it in its extreme forward position for a few seconds. A round punch, *f*, works in a correspondingly-shaped aperture in the center of the angular punch *d*, and is connected to a projection, *s*, from the rear slide-plate B, which passes through a slot in the front sliding plate G, as represented in Figs. 4 and 5.

The rear end of the round punch *f* bears against the horizontal wedge *r*, which is adjusted in its position by means of the screw-nut *q*, working on a screw-shank projecting from the small end of the said wedge, as shown in Fig. 4. The head of the said round punch *f'* is secured within the projection *s* by means of the thin plates *t* and *n'*, working in a transverse slot in *s*, the screw-shank *u'* projecting from *n'* and the nut *u*, as represented in Fig. 8. The proper reciprocating movements are imparted to the round punch *f'* by means of the cam *o*, placed on the shaft K immediately within the cam *p* and working in an aperture in the plate B, the shape of the said aperture and also of the cam *o* being shown in Fig. 6.

To allow the nut to expand in thickness when the round punches are operating upon it to form the hole or eye in it I give the bottom *j* of the nut-box an elastic bearing by causing the outer end of the sliding plate F to bear against the spring A at the time a nut is being formed.

The projecting portion of the bottom *j* of the nut-box is secured between outwardly-projecting jaws from the inner end of the sliding plate H by means of keys *i i*, the clamp *t'*, Fig. 4, and the set-screws *i''* and *v*, or in any other suitable manner. The bottom *j* of the nut-box is thrown forward to discharge a finished nut and then drawn back again preparatory to forming another nut by means of the cam *c* on the shaft J, which works in an oblong rectangular opening in the plate H, as represented in Fig. 7.

A round punch, *e*, works in a correspondingly-shaped aperture in the center of the bottom *j* of the nut-box. The head of the said round punch *e* is secured between projections from the front side of the inner end of the sliding plate F by means of the clamp *w*, the tapering key *b'*, and the set-screw *w'*, as represented in Figs. 1 and 5, or in any other suitable manner. The tapering key *b'* passes through an oblong mortise in the head of the round punch *e*, and a set-screw, *f*, is inserted in a screw-aperture in the end of the said head, and bears against the edge of the said key *b'*, by means of which arrangement the round punch *e* can be thrown in or out and secured in any desired position.

The necessary reciprocating movements are imparted to the round punch *e* during the performance of the machine by means of the two cams *a* and *b* on the shaft J, working in a recess opening in the sliding plate F, in the manner hereinafter set forth.

A suitable form of the metallic frame of my improved nut-making machine is represented in the accompanying drawings, and designated by the letters N, R R, Q Q. The respective pairs of sliding plates G B and F H are secured in shouldered recesses in the vertical positions of the frame, as shown at R R, by means of the series of inner beveled bearers, *v' v'*, Fig. 4, and the series of outer beveled bearers, F' F' and G' G', and a suitable number of set-screws, *a a' a'' a'''*, a portion of which set-screws pass through the said bearers and are tapped into the said portions of the frame R R, and the remainder pass through the projections from the said portions of the frame above and below the sliding plates B G and F H, and act against the outer edges of the bearers F' F', G' G', *b' b'*; or the said sliding plates may be supported in proper potions in any other suitable manner.

The shafts J K work in suitable bearings, and are rotated by means of cog-wheels E E on their inner ends, which gear into a pinion, D, on the driving-shaft I.

The accompanying drawings represent the respective parts of my improved nut-making machine in the position they are thrown into immediately after the last movement in forming a nut and discharging it from the machine. From this position the said parts move as follows: When the machine is put in motion, the cam *p* strikes against the surface *p'* at the inner side of the aperture in the sliding plate G, and carries forward the punch *d* toward the mouth of the nut-box, and at the same time the cam *c* strikes against the rear edge of the aperture in the sliding plate H, and produces a rearward motion of the bottom *j* of the nut-box preparatory to the reception within said box of the red-hot blank cut off by the punch *d* in its forward movement. The said sliding plate H is thrown outward until its outer end is brought in contact with the adjustable projection Z'' from the spring A, and at the same time this takes place the advancing punch *d* brings the blank nut just in contact with the bottom of the nut-box. While the segment-shaped portion of the cam *p* is acting upon the punch *d* through the sliding plate G, the cam *b* strikes against the surface *c'* at the inner side of the aperture in the plate F, and carries forward the round punch *e*, and at the same moment the projection *o''* of the cam *o* strikes against the surface *l'*, Fig. 6, at the inner side of the aperture of the plate B, and carries forward the round punch *f'*. The said cams *b* and *o* are so proportioned that they carry forward the round punches *e* and *f'* into the hot yielding nut-blank until they nearly meet in the center of the same, which movement of the said punches forms the hole in the nut-blank by forcing the metal from the center thereof into the body of the same, thereby causing the nut formed to be thicker than the bar from which it was cut, and thereby giving the top and bottom sides of the nut the proper form by expanding it against the bottom of the nut-box and the end of the punch *d*, the proper forms being made in the end of the said punch and the bottom *j* of the nut-box—the bottom of the nut-box giving back to allow the nut to increase in thickness, and at the same time to press hard enough upon it to give it the required form as the nut expands against the said bottom—by the increased pressure from the center outward, which thus insures absolute perfection of form at every side and angle. The projection *o''* of the cam *o* passes over the surface *l'* of the plate B and ceases to operate upon the round punch *f*, while the round punch *e* is still advancing and while the segment-shaped portion of the cam *p* is acting upon the angular punch *d* through the medium of the sliding plate G. The round punch *f'* is carried outward by the action of the angle *o'* of the cam *o* against the surface *l''* of the plate B, while the round punch *e* is carried forward by the cam *b* until it passes through the nut and enters a short distance into the aperture in the end of the angular punch *d* left by the receding round punch *f'*, where it deposits the wad which was formed in the center of the nut-blank when the ends of the round punches were brought nearly in contact with each other, as before described. The moment the cam *b* ceases to carry forward the round punch *e* the cam *a* strikes the surface *m'* at the outer side of the aperture in the plate F and withdraws the said punch, and simultaneously with said movement the cam *c* strikes against the inner side of the plate H and carries forward the bottom of the nut-box to discharge the finished nut. The moment that the finished nut is carried out clear of the nut-box it is separated from the bottom of the nut-box by the action of the spring-bar *m*, which is forced inward against the nut by the projection *r* on the cog-wheel E.

Immediately after a finished nut has been discharged from the machine the angle *o'* of the cam *o* strikes against the surface *l'*, Fig. 6, of the plate B, and thrusts the end of the round punch *f'* a short distance out of the end of the angular punch *d* for the purpose of discharging therefrom the thin wad (which was deposited therein in forming the previous nut) preparatory to the forward movement of the said punch *d* for the purpose of forming another nut by the aid of the movements of the other parts of the machine, in the manner substantially as hereinbefore described.

What I claim as my invention, and desire to secure by Letters Patent in the manufacture of metallic nuts, is—

Forcing a portion or the whole of the metal displaced in forming the holes in the nuts in the bodies of the nuts, by which I am enabled to make the nuts thicker and more compact than the bar from which they are cut, all substantially as hereinbefore set forth.

R. H. COLE.

Witnesses:
AMOS BROADNAX,
MORITZ RISSMANN.